United States Patent
Beaucaire et al.

(10) Patent No.: US 11,993,310 B2
(45) Date of Patent: May 28, 2024

(54) FALSE WARNING MITIGATION

(71) Applicant: International Truck Intellectual Property Company, LLC, Lisle, IL (US)

(72) Inventors: James Thomas Beaucaire, Wheaton, IL (US); Venkat Sunil Tanneru, Aurora, IL (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 84 days.

(21) Appl. No.: 17/825,422

(22) Filed: May 26, 2022

(65) Prior Publication Data
US 2023/0382456 A1 Nov. 30, 2023

(51) Int. Cl.
G08B 21/00 (2006.01)
B62D 13/00 (2006.01)
B62D 15/02 (2006.01)
G08B 29/18 (2006.01)

(52) U.S. Cl.
CPC ............ *B62D 15/029* (2013.01); *B62D 13/00* (2013.01); *G08B 29/185* (2013.01)

(58) Field of Classification Search
CPC ..... B62D 15/029; B62D 13/00; G08B 29/185
USPC ........................................................ 340/431
See application file for complete search history.

(56) References Cited

U.S. PATENT DOCUMENTS

| | | | |
|---|---|---|---|
| 5,530,421 A | 6/1996 | Marshall et al. | |
| 6,259,357 B1* | 7/2001 | Heider | B60D 1/36 280/504 |
| 11,299,158 B2* | 4/2022 | Niewiadomski | B60W 30/18036 |
| 2011/0022282 A1* | 1/2011 | Wu | B60T 8/1708 701/70 |
| 2019/0299947 A1* | 10/2019 | Higashitani | B60T 7/22 |
| 2021/0151867 A1* | 5/2021 | Prabhakar | H01Q 1/38 |

OTHER PUBLICATIONS

Markel, Andrew. "What and Why of Sensing the Steering Angles," Brake & Front End, Jan. 14, 2021, accessed Mar. 1, 2022. https://www.tomorrowstechnician.com/steering-angle-sensor-101/ (7 pages).
Brinkley, Dave. "Understanding the interconnectedness of steering angle sensors," https://www.vehicleservicepros.com/collision-repair/adascalibrationprogramming/article/21201354/understanding-the-interconnectedness-of-steering-angle-sensors, dated Sep. 1, 2020, accessed Mar. 1, 2022 (11 pages).
Fleet Equipment Staff, "WABCO launches OnSide blind spot detection system," https://www.fleetequipment.mag.com/wabco-truck-onside-blind-spot-detection system/, dated Nov. 1, 2017, accessed Feb. 25, 2022 (4 pages).

(Continued)

*Primary Examiner* — Tai T Nguyen
(74) *Attorney, Agent, or Firm* — Mark C. Bach; Umang Khanna

(57) ABSTRACT

A method of mitigating false warning on a vehicle having at least one side radar sensor, a steering wheel and a steering angle sensor comprises the at least one side radar sensor not detecting an object. The steering angle sensor detects that the steering wheel has moved such that the vehicle and the trailer are out of line. Warning arising from the at least one side radar sensor is suspended.

2 Claims, 2 Drawing Sheets

(56) References Cited

OTHER PUBLICATIONS

"Blind spot detection for heavy commercial vehicles," https://www.bosch-mobility-solutions.com/en/solutions/assistance-systems/blind-spot-detection-cv/, published Aug. 10, 2020, accessed Feb. 25, 2022 (8 pages).
"Blind Spot Detection," BrandMotion, 2020, (4 pages).
"Blind Spot Detection," https://www.continental-automotive.com/en-gl/Trucks-Buses/Vehicle-Chassis-Body/safety-topics/Functions/Blind-Spot-Detection, published 2014, accessed Feb. 25, 2022 (3 pages).
"The Senzar Blind Spot Detection System," https://www.mwsmag.com/the-senzar-blind-spot-detection-system, published Nov. 20, 2019, accessed Feb. 25, 2022 (7 pages).

\* cited by examiner

FALSE WARNING MITIGATION

BACKGROUND

This disclosure relates generally to apparatus and to method for mitigating false warning given to a user. More specifically, this disclosure relates to apparatus and to method for mitigating false warning given to an operator of a vehicle.

As shown in FIG. 1, a vehicle 10, such as a trailer tractor, human operated or autonomous, and the like use a plurality of sensors, such as radar, LiDAR, proximity, optical and the like combined with appropriate software, either present on the vehicle, remote to the vehicle, or combination of those, to monitor condition of the vehicle 10 and/or environment of the vehicle 10. The plurality of sensors includes a steering angle sensor 30 operatively associated with a steering wheel 28 on the vehicle 10. The steering angle sensor 30 monitors rotation of the steering wheel 28. Each of the plurality of sensors is operatively connected, wired or wirelessly, with a computer 11 on the vehicle 10.

A subset of that plurality of sensors and appropriate software comprises a blind spot detector that utilizes at least one side radar sensor 12A having a field of view represented by curves 14A and at least one opposite side radar sensor 12B having a field of view represented by curves 14B disposed on opposite sides of the vehicle 10 to detect an object, such as another vehicle and the like, adjacent to and independent of the vehicle 10 and a trailer 20 connected to the vehicle 10 and outside field of view of the operator of vehicle 10.

The vehicle 10 may include a hitch 16, such as a fifth wheel and the like, that mates with a kingpin 18 disposed on a trailer 20. When the kingpin 18 is appropriately positioned with respect to the hitch 16, movement of the vehicle 10 causes complementary movement of the trailer 20. At least one sensor 22, such as a Hall effect sensor and the like, may be operatively associated with at least one of the hitch 16 and the kingpin 18 to monitor relative positioning of the hitch 16 and the kingpin 18 thereby providing indication of relative disposition of the vehicle 10 and the trailer 20. When the vehicle 10 is connected with the trailer 20, the blind spot detector needs to detect an object that is independent of vehicle 10 connected with trailer 20 and outside field of view of the operator of vehicle 10.

As illustrated in FIG. 2, when the vehicle 10 is connected with a trailer 16, and the vehicle 10 makes a turn, i.e., the vehicle 10 is out of line with the trailer 16, the at least one side radar sensor 12A on the vehicle 10 may detect a portion 24 of the trailer 16 as an object independent of combination of the vehicle 10 and the trailer 20 and outside field of view of the operator of vehicle 10, and give the operator of the vehicle 10 a warning of an object present in the blind spot of the operator. As this warning was generated by the at least one side radar sensor 12A on the vehicle 10 detecting the portion 24 of the trailer 20 connected with the vehicle 10 and not an object independent of combined vehicle 10 and trailer 20 and outside field of view of the operator of vehicle 10, this is a false warning.

False warning may unnecessarily alarm the operator of the vehicle 10. It is desirable to provide apparatus and method that mitigate such false warning.

SUMMARY

One embodiment of a method of mitigating false warning on a vehicle having at least one side radar sensor, a steering wheel and a steering angle sensor comprises the at least one side radar sensor not detecting an object. The steering angle sensor detects that the steering wheel has moved such that the vehicle and the trailer are out of line. Warning arising from the at least one side radar sensor is suspended.

Another embodiment of mitigating false warning on a vehicle having at least one side radar sensor, a steering wheel and a steering angle sensor comprises the at least one side radar sensor not detecting an object. The steering angle sensor monitors movement of the steering wheel. Warning arising from the at least one radar sensor as the steering angle sensor determines that space between the vehicle and the trailer has decreased is suspended.

DETAILED DESCRIPTION

Figure 1:
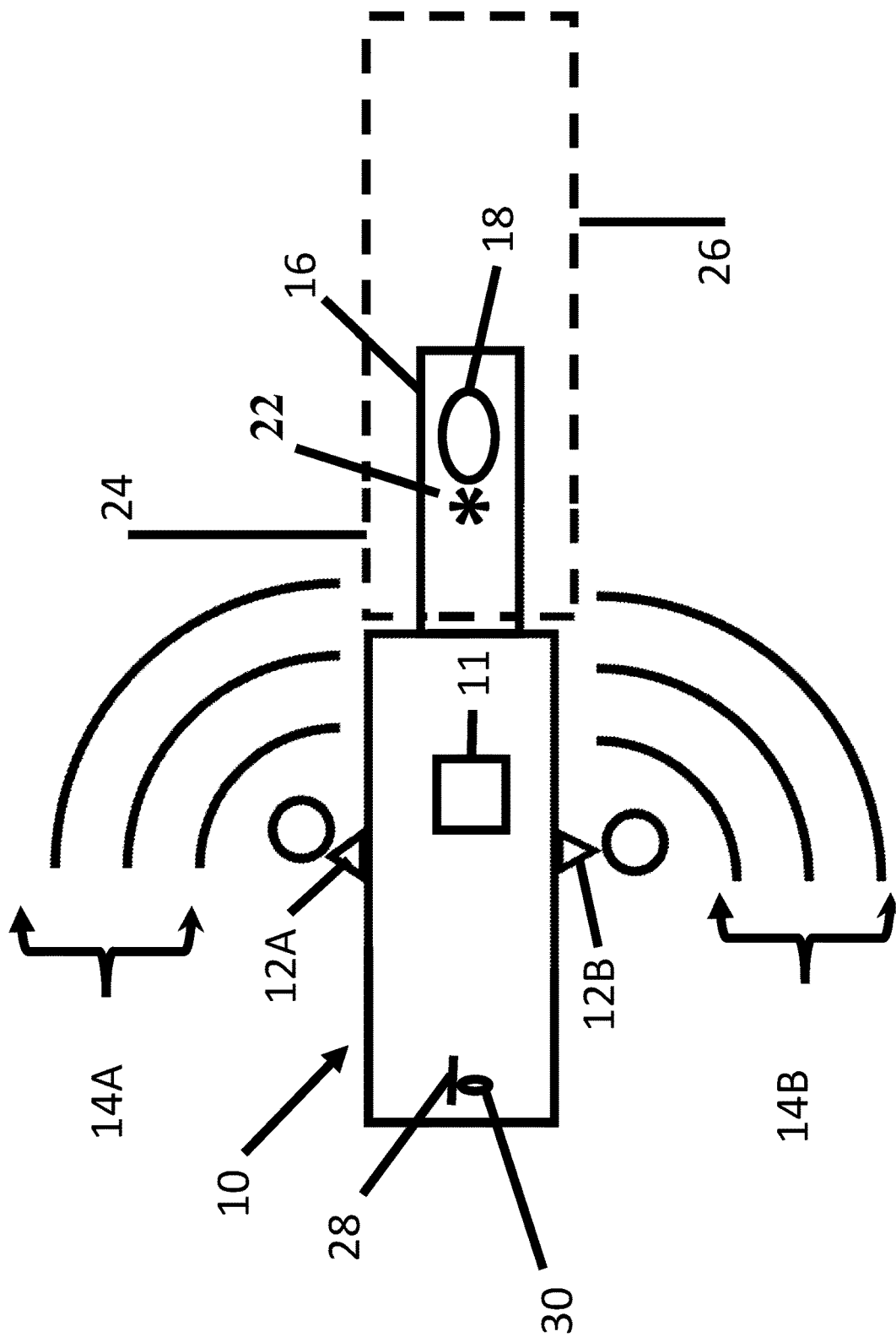
FIG. 1 is a diagrammatic view of a vehicle, including an embodiment of apparatus for mitigating false warning described herein, connected and in line with a trailer.
Figure 2:
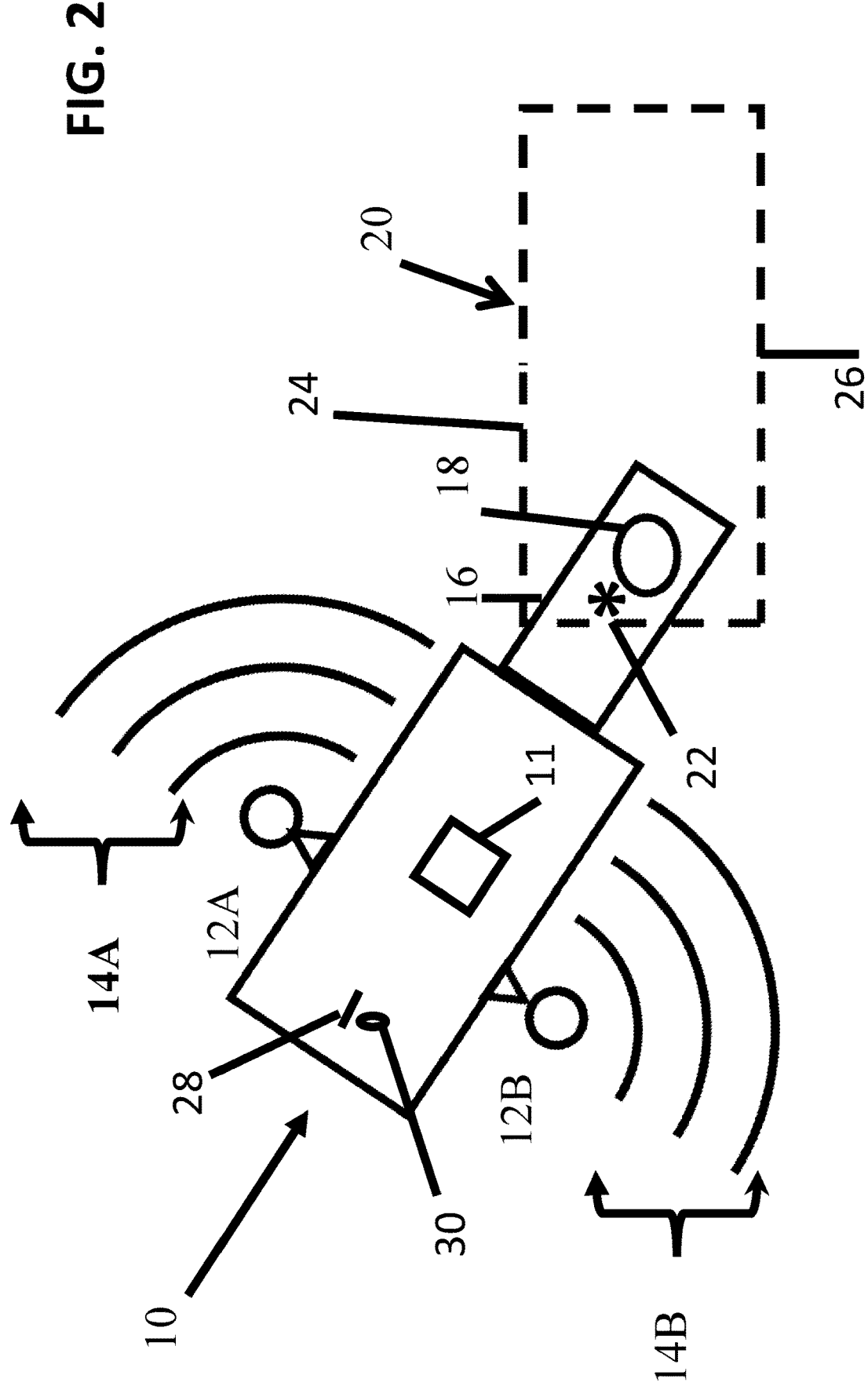
FIG. 2 is a view similar to FIG. 1 with the vehicle being out of line with the trailer.

This disclosure includes embodiments of apparatus and embodiments of method that mitigate false warning. More specifically, this disclosure includes embodiments of apparatus and embodiments of method that mitigate false warning when a vehicle 10 is out of line with a trailer 20 connected with the vehicle 10 and outside field of view of the operator of vehicle 10. As the false warning arises from at least one side radar sensor 12A on the vehicle 10 detecting a portion 24 of the trailer 16 as an object independent of the vehicle 10 and the trailer 20 connected with the vehicle 10 and outside field of view of the operator of vehicle 10, or at least one side radar sensor 12B on the vehicle 10 detecting an opposite portion 26 of the trailer 16 as an object independent of the vehicle 10 and the trailer 20 connected with the vehicle 10 and outside field of view of the operator of vehicle 10, one embodiment of an apparatus and one embodiment of a method mitigating false warning comprise suspending warning arising from at least one side radar sensor 12A or 12B on the vehicle 10, i.e. a blind spot warning, when at least one of the steering angle sensor 30 determines that the steering wheel 28 has moved sufficiently and the least one sensor 22 operatively associated with at least one of the hitch 16 and the kingpin 18 determines that the vehicle 10 is out of line with the trailer 20 connected with the vehicle 10.

As shown in the Figures, the at least one side radar sensor 12A on the vehicle 10 corresponds to a right hand turn, and at least one side radar sensor 12B on the vehicle 10 corresponds to a left hand turn. These turns can be confirmed with reference to at least one of the at least one sensor 22 operatively associated with at least one of the hitch 16 and the kingpin 18 and the steering angle sensor 30.

Suspending warning arising from at least one side radar sensor 12A or 12B on the vehicle 10 occurs if no object independent of the vehicle 10 and the trailer 20 connected with the vehicle 10 and outside field of view of the operator of vehicle 10 is detected for a first period of time. The first period of time may depend on many factors, such as speed of the vehicle 10 connected with the trailer 20, road condition, weather and the like. The first period of time may be fixed or variable. In one embodiment, the first period of time is within the range of 20 seconds to 40 seconds.

Once suspension of warning arising from at least one side radar sensor 12A or 12B on the vehicle 10 is active, i.e. no blind spot warning is generated, the suspension of warning arising from at least one side radar sensor 12A or 12B on the vehicle 10 remains in effect until at least one of the at least one sensor 22 on at least one of the hitch 16 and the kingpin 18 and the steering angle sensor 30 indicate that the vehicle 10 and the trailer 20 are in line for a second period of time. Once the second period of time has expired, the suspension of warning arising from at least one side radar sensor 12A or 12B on the vehicle 10 is lifted and warning arising from at least one side radar sensor 12A or 12B on the vehicle 10 may be generated and conveyed to the operator of the vehicle 10.

Other embodiments of apparatus and other embodiments of method that mitigate false warning when a vehicle 10 is out of line with a trailer 20 connected with the vehicle 10 and outside field of view of the operator of vehicle 10 comprise adjusting at least one of range angle of at least one of the side radar sensor 12A or 12B and adjusting radar range area of consideration of at least one side radar sensor 12A or 12B. At least one of the at least one sensor 22 on at least one of the hitch 16 and the kingpin 18 monitors relative positioning of the hitch 16 and the kingpin 18 thereby providing indication of relative disposition of the vehicle 10 and the trailer 20 and the steering angle sensor 30 monitors movement of the steering wheel 28 as the vehicle 10 makes a turn. This corresponds to turn angle of the vehicle 10.

As turn angle of the vehicle 10 connected with the trailer 20 increases from either side of a longitudinal midline of the vehicle 10 connected with the trailer 20, an angle between the vehicle 10 and the trailer 20 decreases. The angle between the vehicle 10 and the trailer 20 defines an area monitored by at least one side radar sensor 12A or 12B. As the angle between the vehicle 10 and the trailer 20 decreases, dimensions of the area correspondingly decrease. Dimensions of the area may be insufficient to accommodate an object that can damage the vehicle 10 or the trailer 20. If at least one of the at least one sensor 22 on at least one of the hitch 16 and the kingpin 18 monitors relative positioning of the hitch 16 and the kingpin 18, and the steering angle sensor 30 detects that the steering wheel 28 has moved such that space between the vehicle 10 and the trailer 20 has decreased sufficiently such that the area has dimensions insufficient to accommodate an object that can damage the vehicle 10 or the trailer 20, then warning arising from at least one side radar sensor 12A or 12B on the vehicle 10 may be suspended.

Once suspension of warning arising from at least one side radar sensor 12A or 12B on the vehicle 10 is active, i.e. no blind spot warning is generated, the suspension of warning arising from at least one side radar sensor 12A or 12B on the vehicle 10 remains in effect until at least one of the at least one sensor 22 on at least one of the hitch 16 and the kingpin 18 and the steering angle sensor 30 indicate that space between the vehicle 10 and the trailer 20 has increased sufficiently such that the area has dimensions sufficient to avoid an object that can damage the vehicle 10 or the trailer 20, then suspension of warning arising from at least one side radar sensor 12A or 12B on the vehicle 10 may be lifted.

What is claimed is:

1. A method of mitigating false warning on a vehicle having a trailer, at least one side radar sensor, a steering wheel, at least one sensor on at least one of a hitch and a kingpin, and a steering angle sensor, the method comprising the steps of:

the at least one side radar sensor not detecting an object independent of the vehicle and the trailer;

the steering angle sensor detecting that the steering wheel has moved such that the vehicle and the trailer are out of line;

suspending warning arising from the at least one side radar sensor; and lifting suspending warning arising from the at least one side radar sensor when the at least one sensor on at least one of the hitch and the kingpin and the steering angle sensor indicate that the vehicle and trailer are in line.

2. A method of mitigating false warning on a vehicle having a trailer, at least one side radar sensor, a steering wheel, at least one sensor on at least one of a hitch and a kingpin, and a steering angle sensor, the method comprising the steps of:

the at least one side radar sensor not detecting an object independent of the vehicle and the trailer;

the steering angle sensor monitoring movement of the steering wheel;

suspending warning arising from the at least one radar sensor as the steering angle sensor determines that the angle between the vehicle and the trailer has decreased such that the area between the vehicle and the trailer is insufficient to accommodate an object that can damage the vehicle or trailer; and lifting suspending warning arising from the at least one side radar sensor when the at least one sensor on at least one of the hitch and the kingpin and the steering angle sensor indicate that the space between vehicle and the trailer has increased to be able to accommodate a damaging object.

\* \* \* \* \*